US008316088B2

(12) United States Patent
Jalava et al.

(10) Patent No.: US 8,316,088 B2
(45) Date of Patent: Nov. 20, 2012

(54) PEER-TO-PEER ENGINE FOR OBJECT SHARING IN COMMUNICATION DEVICES

(75) Inventors: Teemu Jalava, Espoo (FI); Jaakko Teinilä, Espoo (FI)

(73) Assignee: Nokia Corporation, Espoo (FI)

( * ) Notice: Subject to any disclaimer, the term of this patent is extended or adjusted under 35 U.S.C. 154(b) by 1913 days.

(21) Appl. No.: 10/886,002

(22) Filed: Jul. 6, 2004

(65) Prior Publication Data

US 2006/0010204 A1   Jan. 12, 2006

(51) Int. Cl.
G06F 15/16 (2006.01)
(52) U.S. Cl. ........ 709/205; 709/201; 709/204; 370/255; 715/201; 715/753
(58) Field of Classification Search .................. 709/238, 709/201, 204, 205, 218; 715/201, 753; 370/255
See application file for complete search history.

(56) References Cited

U.S. PATENT DOCUMENTS

| | | | |
|---|---|---|---|
| 4,926,326 A | 5/1990 | McKinley | |
| 5,542,115 A | 7/1996 | Wong et al. | |
| 5,631,847 A | 5/1997 | Kikinis | |
| 5,740,549 A | 4/1998 | Reilly et al. | |
| 5,832,474 A | 11/1998 | Lopresti et al. | |
| 5,852,436 A | 12/1998 | Franklin et al. | |
| 5,862,325 A | 1/1999 | Reed et al. | |
| 5,933,478 A | 8/1999 | Ozaki et al. | |
| 6,061,796 A * | 5/2000 | Chen et al. | 726/15 |
| 6,065,044 A | 5/2000 | Ogasawara | |
| 6,067,561 A | 5/2000 | Dillon | |
| 6,094,676 A * | 7/2000 | Gray et al. | 709/217 |
| 6,094,681 A | 7/2000 | Shaffer et al. | |
| 6,278,448 B1 | 8/2001 | Brown et al. | |
| 6,288,715 B1 | 9/2001 | Bain et al. | |
| 6,366,907 B1 | 4/2002 | Fanning et al. | |

(Continued)

FOREIGN PATENT DOCUMENTS

EP     1 427 170 A2    6/2004

(Continued)

OTHER PUBLICATIONS

Bram Cohen, "Incentives Build Robustness in BitTorrent," <http://web.archive.org/web/20060507202006/http://www.bittorrent.org/bittorrentecon.pdf>, May 22, 2003.*

(Continued)

*Primary Examiner* — Thu Ha Nguyen
(74) *Attorney, Agent, or Firm* — Ditthavong Mori & Steiner, P.C.

(57) ABSTRACT

This invention describes a method for sharing of application specific objects between communication devices (e.g., a mobile communication device or a mobile phone) using middleware containing a peer-to-peer engine. This engine is completely peer-to-peer based and no servers are needed in the network. Especially games are seen as a promising potential application for the invention. An application registers to the peer-to-peer (P2P) engine when it wants to share or download files. The P2P engine takes care of the file sharing and informs when a new file has been downloaded so the application can start using it and the P2P engine delivers them to the appropriate application directories. The P2P engine can use either a 2G or 3G general packet radio system (GPRS), a wideband code division multiple access (WCDMA) or a Bluetooth as a transport for the file sharing and the choice of the transport is left to the user.

33 Claims, 3 Drawing Sheets

U.S. PATENT DOCUMENTS

| | | | |
|---|---|---|---|
| 6,396,513 B1 | 5/2002 | Helfman et al. | |
| 6,400,810 B1 | 6/2002 | Skladman et al. | |
| 6,438,632 B1 | 8/2002 | Kikugawa | |
| 6,507,866 B1 | 1/2003 | Barchi | |
| 6,549,916 B1 | 4/2003 | Sedlar | |
| 6,591,310 B1 | 7/2003 | Johnson | |
| 6,658,000 B1 | 12/2003 | Raciborski et al. | |
| 6,675,205 B2 | 1/2004 | Meadway et al. | |
| 6,757,684 B2 | 6/2004 | Svendsen et al. | |
| 6,779,039 B1 | 8/2004 | Bommareddy et al. | |
| 6,865,600 B1* | 3/2005 | Brydon et al. | 709/219 |
| 6,892,210 B1* | 5/2005 | Erickson et al. | 1/1 |
| 7,030,837 B1 | 4/2006 | Vong et al. | |
| 7,068,309 B2 | 6/2006 | Toyama et al. | |
| 7,089,301 B1* | 8/2006 | Labio et al. | 709/224 |
| 7,107,316 B2 | 9/2006 | Brown et al. | |
| 7,139,594 B2 | 11/2006 | Nagatomo | |
| 7,170,999 B1* | 1/2007 | Kessler et al. | 380/277 |
| 7,305,082 B2 | 12/2007 | Elazar et al. | |
| 7,310,629 B1* | 12/2007 | Mendelson et al. | 707/3 |
| 7,430,616 B2 | 9/2008 | Husain et al. | |
| 7,441,180 B1* | 10/2008 | Kaczmarek et al. | 715/201 |
| 7,496,630 B2 | 2/2009 | Arellano et al. | |
| 7,509,377 B2 | 3/2009 | Harvey et al. | |
| 7,509,492 B2 | 3/2009 | Boyen et al. | |
| 7,549,047 B2* | 6/2009 | Balfanz et al. | 713/169 |
| 7,551,570 B2 | 6/2009 | Nurminen et al. | |
| 7,613,770 B2* | 11/2009 | Li | 709/203 |
| 7,643,458 B1 | 1/2010 | Talwar et al. | |
| 7,716,302 B2* | 5/2010 | Maze et al. | 709/217 |
| 7,769,810 B1* | 8/2010 | Kaufman | 709/205 |
| 7,990,896 B1* | 8/2011 | Delker et al. | 370/255 |
| 2002/0007401 A1 | 1/2002 | Suzuki | |
| 2002/0049760 A1 | 4/2002 | Scott et al. | |
| 2002/0059384 A1 | 5/2002 | Kaars | |
| 2002/0095399 A1 | 7/2002 | Devine et al. | |
| 2002/0129086 A1 | 9/2002 | Garcia-Luna-Aceves et al. | |
| 2002/0143944 A1 | 10/2002 | Traversat et al. | |
| 2002/0147771 A1 | 10/2002 | Traversat et al. | |
| 2002/0156893 A1 | 10/2002 | Pouyoul et al. | |
| 2002/0165979 A1 | 11/2002 | Vincent | |
| 2002/0184310 A1 | 12/2002 | Traversat et al. | |
| 2002/0184311 A1 | 12/2002 | Traversat et al. | |
| 2002/0184357 A1 | 12/2002 | Traversat et al. | |
| 2002/0188657 A1 | 12/2002 | Traversat et al. | |
| 2002/0188735 A1 | 12/2002 | Needham et al. | |
| 2002/0194256 A1 | 12/2002 | Needham et al. | |
| 2003/0018708 A1 | 1/2003 | Hlasny | |
| 2003/0041265 A1 | 2/2003 | Lagimonier et al. | |
| 2003/0050834 A1 | 3/2003 | Caplan | |
| 2003/0055818 A1 | 3/2003 | Faybishenko et al. | |
| 2003/0056093 A1 | 3/2003 | Huitema et al. | |
| 2003/0063770 A1 | 4/2003 | Svendsen et al. | |
| 2003/0070070 A1 | 4/2003 | Yeager et al. | |
| 2003/0074403 A1* | 4/2003 | Harrow et al. | 709/203 |
| 2003/0088547 A1 | 5/2003 | Hammond | |
| 2003/0088571 A1 | 5/2003 | Ekkel | |
| 2003/0110181 A1 | 6/2003 | Schuetze et al. | |
| 2003/0125063 A1 | 7/2003 | Svensson et al. | |
| 2003/0152034 A1 | 8/2003 | Zhang et al. | |
| 2003/0177184 A1 | 9/2003 | Dickerman et al. | |
| 2003/0182428 A1* | 9/2003 | Li et al. | 709/227 |
| 2003/0191816 A1 | 10/2003 | Landress et al. | |
| 2003/0225834 A1 | 12/2003 | Lee et al. | |
| 2003/0233455 A1 | 12/2003 | Leber et al. | |
| 2004/0003090 A1 | 1/2004 | Deeds | |
| 2004/0030743 A1 | 2/2004 | Hugly et al. | |
| 2004/0041836 A1 | 3/2004 | Zaner et al. | |
| 2004/0041849 A1 | 3/2004 | Mock et al. | |
| 2004/0064512 A1 | 4/2004 | Arora et al. | |
| 2004/0068429 A1 | 4/2004 | MacDonald | |
| 2004/0088348 A1 | 5/2004 | Yeager et al. | |
| 2004/0103280 A1* | 5/2004 | Balfanz et al. | 713/169 |
| 2004/0107242 A1 | 6/2004 | Vert et al. | |
| 2004/0114605 A1 | 6/2004 | Karaoguz et al. | |
| 2004/0133571 A1 | 7/2004 | Devine et al. | |
| 2004/0148434 A1 | 7/2004 | Matsubara et al. | |
| 2004/0179689 A1 | 9/2004 | Maggenti et al. | |
| 2004/0205219 A1 | 10/2004 | Li et al. | |
| 2004/0243580 A1 | 12/2004 | Markki et al. | |
| 2004/0243665 A1 | 12/2004 | Markki et al. | |
| 2004/0243672 A1 | 12/2004 | Markki et al. | |
| 2004/0243682 A1 | 12/2004 | Markki et al. | |
| 2005/0021398 A1* | 1/2005 | McCleskey et al. | 705/14 |
| 2005/0120073 A1* | 6/2005 | Cho | 709/201 |
| 2005/0216300 A1 | 9/2005 | Appelman et al. | |
| 2005/0243740 A1 | 11/2005 | Chen et al. | |
| 2006/0004789 A1 | 1/2006 | Lunt et al. | |
| 2006/0020662 A1 | 1/2006 | Robinson | |
| 2006/0039359 A1 | 2/2006 | Pang | |
| 2006/0153247 A1 | 7/2006 | Stumer | |
| 2006/0168006 A1 | 7/2006 | Shannon et al. | |
| 2006/0209727 A1 | 9/2006 | Jennings et al. | |
| 2006/0218225 A1 | 9/2006 | Hee Voon et al. | |
| 2007/0064702 A1 | 3/2007 | Bates et al. | |
| 2007/0230482 A1 | 10/2007 | Shim et al. | |
| 2007/0237139 A1 | 10/2007 | Garcia-Martin et al. | |
| 2007/0239759 A1 | 10/2007 | Shen et al. | |
| 2007/0250582 A1 | 10/2007 | Sidhu et al. | |
| 2008/0077669 A1* | 3/2008 | Ozveren et al. | 709/205 |
| 2008/0091777 A1* | 4/2008 | Carlos | 709/204 |
| 2008/0177860 A1* | 7/2008 | Khedouri et al. | 709/217 |
| 2009/0182842 A1* | 7/2009 | Dutta et al. | 709/218 |
| 2009/0187982 A1* | 7/2009 | Balfanz et al. | 726/9 |
| 2009/0240821 A1* | 9/2009 | Juncker et al. | 709/228 |
| 2010/0095009 A1 | 4/2010 | Matuszewski et al. | |
| 2010/0185956 A1* | 7/2010 | Anantharaman et al. | 715/753 |
| 2010/0306339 A1* | 12/2010 | Ling et al. | 709/213 |
| 2011/0041158 A1 | 2/2011 | Ranzini et al. | |
| 2011/0113350 A1* | 5/2011 | Carlos | 715/753 |

FOREIGN PATENT DOCUMENTS

| | | |
|---|---|---|
| EP | 1429513 A | 6/2004 |
| EP | 1 452 978 A2 | 9/2004 |
| EP | 1 526 471 A1 | 4/2005 |
| WO | WO 03/085559 A1 | 10/2003 |
| WO | WO 2004/046969 A1 | 6/2004 |
| WO | 2004/084030 A2 | 9/2004 |
| WO | 2004/107124 A2 | 12/2004 |
| WO | 2005/041534 A1 | 5/2005 |
| WO | 2005/125149 A1 | 12/2005 |

OTHER PUBLICATIONS

Bram Cohen, "BitTorrent Protocol Documentation," <http://web.archive.org/web/20030202095656/bitconjurer.org/BitTorrent/protocol.html>, Feb. 2, 2003.*

Karthik Tamilmani, "Robustness of BitTorrent protocol," <http://web.archive.org/web/20031205222053/http://mnl.cs.stonybrook.edu/home/karthik/BitTorrent/Robustness_of_BT.doc>, Dec. 5, 2003.*

Brian Dessent, "Brian's BitTorrent FAQ and Guide," <http://web.archive.org/web/20030604041823/http://www.dessent.net/btfaq/>, Jun. 4, 2003.*

P2P technologies, Gnutella and Kazaa, http://www.limewire.com/english/content/home, shtml http://www.kazaa.com/us/help/glossary/p2p.htm.

FileSharing for net, from the Internet.

SIP: Session Initiation Protocol, from the Internet.

U-P2P: A Peer-to-Peer System for Description and Discovery of Resource-sharing Communities, A. Mukherjee, et al, Proceedings of the 22$^{nd}$ International Conference on Distributed Computing Systems Workshops Jul. 2-5, 2002, IEEE.

Protocol for Peer-to-Peer Networking in Mobile Environments, Schollmeier R. et al, Computer Communications and Networks 2003, ICCCN, 2003. The 12$^{th}$ International Conference on Dallas TX, USA Oct. 20-22, 2203. IEEE.

Chinese Office action for corresponding CN application No. 2005800227103 dated May 8, 2009, pp. 1-14.

Chinese Office action for corresponding CN application No. 200580022710.3 dated Sep. 2, 2010, pp. 1-17.

European Office action for corresponding EP application No. 10166569.3-2413 dated Sep. 17, 2010, pp. 1-6.

Office action received for corresponding Chinese Patent Application No. 200480020040.7, dated Feb. 13, 2009, 8 pages of office action and 10 pages of office action translation.

Office action received for corresponding Korean Patent Application No. 2005-7022638, dated Dec. 12, 2006, 3 pages of office action and 2 pages of office action translation.
Non-Final Office action received for corresponding U.S. Appl. No. 10/446,574, dated Jun. 15, 2005, 17 pages.
OBEX Object Push Profile (OPP), perhaps over Bluetooth, IrDA, 802.11b, 802.11g, GPRS, EDGE, UMTS, or the like.
IEEE 1394, IEEE 1394b, IEEE 802.11a, IEEE 802.11b, IEEE 802.11g, IEEE 802.16a, IEEE 802.20, Bluetooth, terrestrial digital video broadcast (DVB-T), satellite digital video broadcast (DVB-S), digital audio broadcast (DAB), general packet radio service (GPRS), Universal Mobile Telecommunications Service (UMTS), DVB-X, IrDA (Infrared Data Association), or other interface known in the art.
Final Office action received for corresponding U.S Appl. No. 10/446,574, dated Nov. 16, 2005, 15 pages.
Final Office action received for corresponding U.S. Appl. No. 10/446,574, dated May 12, 2006, 15 pages.
Non-Final Office action received for corresponding U.S. Appl. No. 10/446,574, dated Oct. 18, 2006, 14 pages.
Chinese Office action for related CN application No. 200780012983.9, dated Mar. 22, 2011, pp. 1-9.
European Office Action for corresponding EP Application No. 10 166 569.3-2413, Jul. 4, 2011, pp. 1-4.
Japanese Office Action for related Application No. 2009-504840, May 30, 2011, pp. 1-4.
Quittek et al., "Problem Statement for SIP-signalled Peer-to-Peer Communication across Middleboxes," P2P-SIP, The Internet Society, 2006.
Singh, et al., "Peer-to-Peer Internet Telephony using SIP," Columbia University Technical Report, Oct. 31, 2004, pp. 1-19 (http://www.cs.columbia.edu/techreports/cucs-044-04.pdf).
Final Office action received for corresponding U.S. Appl. No. 11/486,490, dated Apr. 27, 2010, 25 pages.
Singh et al., "Peer-to-peer internet telephony using SIP", Retrieved on Mar. 14, 2011, Webpage available at: http://www.cs.columbia.edu/techreports/cucs-044-04.pdf.
Georgescu, "Addressing survivability and scalability of SIP networks by using Peer-to-Peer protocols", SIP Center, Retrieved on Mar. 14, 2010, Webpage available at: http://www.sipcenter.com/sip.nsf/html/AG+P2P+SIP.
International Preliminary Report on Patentability received for corresponding Patent Cooperation Treaty Application No. PCT/IB2007/000677, dated Aug. 8, 2008, 5 pages.
International Search Report and Written Opinion received for corresponding Patent Cooperation Treaty Application No. PCT/IB2007/000677, dated May 24, 2007, 9 pages.
Chord/DHash Project—Overview, Retrieved on Mar. 11, 2011, Webpage available at: http://pdos.csail.mit.edu/chord/.
Garcia-Martin et al., "A Session Initiation Protocol (SIP) Event Package and Data Format for Describing Generic Resources", draft-garcia-sipping-resource-event-package-00.txt, Retrieved on Mar. 11, 2011, Webpage available at: http://www.mail-archive.com/i-d-announce@ietf.org/msg10628.html.
Kademlia: A peer-to-peer information system based on the XOR metric, Webpage available at: http://www.kademlia.net/.
Garcia-Martin et al."A Framework for Sharing Resources with the Session Initiation Protocol (SIP)", Internet-Draft, draft-beijar-sipping-resource-sharing-00.txt, Jun. 2006.
International Search Report and Written Opinion received for corresponding Patent Cooperation treaty Application No. PCT/IB2007/053981, dated Apr. 3, 2008, 11 pages.
Kunwadee et al., "Efficient Content Location Using Interest-Based Locality in Peer-to-Peer Systems", IEEE Societies Twenty-Second Annual Joint Conference of the IEEE Computer and Communications, Mar. 30-Apr. 3, 2003, vol. 3, pp. 2166-2176.
Chinese Office Action for CN Application No. 200580022710.3 dated Nov. 21, 2011, pp. 1-9.
Chinese Office Action for CN Application No. 200780012983.9 dated Dec. 16, 2011, pp. 1-7.
Office Action for related U.S. Appl. No. 12/443,922 dated Nov. 9, 2011, pp. 1-30.
Final Office action received for corresponding U.S. Appl. No. 10/446,574, dated Apr. 4, 2007, 14 pages.

Non-Final Office action received for corresponding U.S. Appl. No. 10/446,574, dated Jul. 23, 2007, 17 pages.
Final Office action received for corresponding U.S. Appl. No. 10/446,574, dated Dec. 20, 2007, 16 pages.
Final Office action received for corresponding U.S. Appl. No. 10/446,574, dated Apr. 29, 2009, 18 pages.
Non-Final Office action received for corresponding U.S. Appl. No. 10/446,574, dated Jun. 10, 2008, 19 pages.
International Preliminary Report on Patentability received for corresponding Patent Cooperation Treaty Application No. PCT/US2004/016544, dated Dec. 19, 2005, 5 pages.
International Search Report and Written Opinion received for corresponding Patent Cooperation Treaty Application No. PCT/US2004/016544, dated Nov. 29, 2005, 6 pages.
Office action received for corresponding Chinese Patent Application No. 200480020037.5, dated Aug. 15, 2008, 3 pages of office action and 3 pages of office action translation.
Office action received for corresponding Chinese Patent Application No. 200480020037.5, dated Nov. 9, 2007, 7 pages of office action translation.
Office action received for corresponding Korean Patent Application No. 2005-7022641, dated Dec. 14, 2006, 3 pages of office action and 2 pages of office action translation.
International Preliminary Report on Patentability received for corresponding Patent Cooperation Treaty Application No. PCT/US2004/016569, dated Dec. 15, 2005, 7 pages.
International Search Report and Written Opinion received for corresponding Patent Cooperation Treaty Application No. PCT/US2004/016569, dated Jul. 21, 2005, 7 pages.
Non-Final Office action received for corresponding U.S. Appl. No. 10/446,576, dated Jan. 9, 2008, 14 pages.
Final Office action received for corresponding U.S. Appl. No. 10/446,576, dated Aug. 7, 2007, 14 pages.
Non-Final Office action received for corresponding U.S. Appl. No. 10/446,576, dated Oct. 18, 2006, 12 pages.
Final Office action received for corresponding U.S. Appl. No. 10/446,576, dated May 16, 2006, 11 pages.
Final Office action received for corresponding U.S. Appl. No. 10/446,576, dated Nov. 16, 2005, 12 pages.
Non-Final Office action received for corresponding U.S. Appl. No. 10/446,576, dated Jun. 15, 2005, 15 pages.
"Napster messages", Retrieved on Mar. 15, 2010, Webpage available at: http://opennap.sourceforge.net/napster.txt.
"The Gnutella Protocol Specification v0.4", Clip2 Distributed Search Services, Retrieved on Mar. 15, 2010, Webpage available at: http://www9.limewire.com/developer/gnutella protocol 0.4.pdf.
Schmidt, "Gridella: an open and efficient Gnutella-compatible Peer-to-Peer System based on the P-Grid approach", EPFL Technical Report, Oct. 2002, 109 pages.
"Fast Track", Webpage available at: http://www.fasttrack.nu.
Aberer et al., "Self-organized construction of distributed access structures: A comparative evaluation of P-Grid and FreeNet", EPFL Technical Report, 2002, 6 pages.
Dabek et al., "Building Peer-to-Peer Systems With Chord, a Distributed Lookup Service", Proceedings of the Eighth Workshop on Hot Topics in Operating Systems, IEEE Computer Society, 2001, 6 pages.
Shin et al., "Grapes: Topology-based Hierarchical Virtual Network for Peer-to-peer Lookup Services", Proceedings of the International Conference on Parallel Processing Workshops, IEEE Computer Society, 2002, 7 pages.
Gold et al., "Towards a Content-basedAggregation Network", Proceedings of the First International Conference on Peer-to-Peer Computing, IEEE Computer Society, 2002, 7 pages.
Lindemann et al., "A Distributed Search Service for Peer-to-Peer File Sharing in Mobile Applications", Proceedings of the Second International Conference on Peer-to-Peer Computing, IEEE Computer Society, 2002, 8 pages.
Kortuem et al., "When Peer-to-Peer comes Face-to-Face:Collaborative Peer-to-Peer Computing in Mobile Ad hoc Networks", Proceedings of the First International Conference on Peer-to-Peer Computing, IEEE Computer Society, 2002, 18 pages.

Hsiao et al., "Modeling and Evaluating Peer-to-Peer Storage Architectures", Proceedings of the International Parallel and Distributed Processing Symposium, IEEE Computer Society, 2002, 6 pages.

Traversat et al., "Project JXTA Virtual Network", Sun Microsystems, Inc., Oct. 28, 2002, pp. 1-10.

Cooper et al., "SIL: Modeling and Measuring Scalable Peer-to-Peer Search", Webpage available at: http://dbpubs.stanford.edu/pub/ 2003, printed Feb. 12, 2004.

Non-Final Office action received for corresponding U.S. Appl. No. 10/674,679, dated Jul. 25, 2007, 15 pages.

Daswani et al., "Open problems in data sharing peer-to-peer systems", Webpage available at: http://dbpubs.stanford.edu:8090/aux/ index-en.html, printed Feb. 12, 2004.

Cooper et al., "Modeling and Measuring Scalable peer-to-peer search networks—Extended version", Proceedings of Association for Computing Machinery (ACM) Annual Conference of the Special Interest Group on Data Communications (SIGCOMM), 2002.

Non-Final Office action received for corresponding U.S. Appl. No. 10/697,622, dated Jul. 18, 2007, 17 pages.

Final Office action received for corresponding U.S. Appl. No. 10/697,622, dated Dec. 5, 2007, 15 pages.

Non-Final Office action received for corresponding U.S. Appl. No. 10/697,622, dated Jul. 22, 2008, 15 pages.

"DEC/HP Network Computing Architecture remote Procedure call Runtime Extension Specification", Version OSD TX1.0.11.

Non-Final Office action received for corresponding U.S. Appl. No. 10/607,618, dated Sep. 22, 2004, 23 pages.

Final Office action received for corresponding U.S. Appl. No. 10/607,618, dated Jun. 30, 2005, 27 pages.

Non-Final Office action received for corresponding U.S. Appl. No. 10/607,618, dated Dec. 21, 2005, 23 pages.

Final Office action received for corresponding U.S. Appl. No. 10/607,618, dated Jun. 21, 2006, 23 pages.

Non-Final Office action received for corresponding U.S. Appl. No. 10/607,618, dated Dec. 12, 2006, 22 pages.

Final Office action received for corresponding U.S. Appl. No. 10/607,618, dated Jun. 29, 2007, 23 pages.

Non-Final Office action received for corresponding U.S. Appl. No. 10/607,618, dated Dec. 19, 2007, 24 pages.

Final Office action received for corresponding U.S. Appl. No. 10/607,618, dated Jun. 27, 2008, 25 pages.

Non-Final Office action received for corresponding U.S. Appl. No. 10/607,618, dated Oct. 9, 2008, 15 pages.

Final Office action received for corresponding U.S. Appl. No. 10/607,618, dated Jul. 9, 2009, 17 pages.

"Mini Http Server. Net", Retrieved on Mar. 24, 2010, Webpage available at: http://minihttpservernet/fbbs.

Office action received for corresponding Chinese Patent Application No. 200580022710.3, dated May 8, 2009, 7 pages of Office action and 11 pages of Office action translation.

Office action received for corresponding Chinese Patent Application No. 200580022710.3, dated Sep. 2, 2010, 7 pages of Office action and 11 pages of Office action translation.

Extended European Search Report received for corresponding European Patent Application No. 10166569.3, dated Sep. 17, 2010, 6 pages.

Office action received for corresponding Korean Patent Application No. 2007-7002771, dated Dec. 20, 2007, 2 pages of Office action translation.

International Preliminary Report on Patentability received for corresponding Patent Cooperation Treaty Application No. PCT/IB2005/ 001126, dated Jan. 18, 2007, 4 pages.

International Search Report and Written Opinion received for corresponding Patent Cooperation Treaty Application No. PCT/IB2005/ 001126, dated Oct. 27, 2005, 6 pages.

Matuszewski et al., "Mobile peer-to-peer content sharing application", 3rd IEEE Consumer Communications and Networking Conference, Jan. 8-10, 2006, pp. 1324-1325.

Matuszewski et al., "Mobile peer-to-peer content sharing services in IMS", Proceedings of the International Conference on Telecommunication Systems, Modeling and Analysis, 2005.

Matuszewski et al., "Content sharing in mobile P2P networks: myth or reality?", International Journal of Mobile Network Design and Innovation, vol. 1, Issue 3/4, Jan. 2006, pp. 197-207.

Office action received for corresponding European Patent Application No. 07705695.0, dated Sep. 28, 2009, 5 pages.

Office action received for corresponding European Patent Application No. 07705695.0, dated Dec. 30, 2009, 4 pages.

Quittek et al., "Problem Statement for SIP-signalled Peer-to-Peer Communication across Middleboxes", draft-quittek-p2p-sip-middlebox-00, Feb. 27, 2006, Retrieved on Mar. 14, 2010, Webpage available at: http://tools.ietf.org/html/draft-quittek-p2p-sip-middlebox-00.

Non-Final Office action received for corresponding U.S. Appl. No. 11/486,490, dated Nov. 14, 2008, 27 pages.

Final Office action received for corresponding U.S. Appl. No. 11/486,490, dated Jun. 16, 2009, 22 pages.

Non-Final Office action received for corresponding U.S. Appl. No. 11/486,490, dated Nov. 18, 2009, 23 pages.

Bryan et al., "A P2P Approach to SIP Registration and Resource Location draft-bryan-sipping-p2p-02", SIPPING WG Internet-Draft, Mar. 5, 2006, pp. 1-53.

Matuszewski et al., "Social Distributed Hash Table", IEEE Wireless Communications and Networking Conference, Mar. 11-15, 2007, pp. 2814-2820.

Tong et al., "Efficient content location based on interest-cluster in peer-to-peer system", IEEE International Conference, Oct. 12-18, 2005, pp. 324-331.

Bryan et al., "SOSIMPLE: A Serverless, Standards-based, P2P SIP Communication System", Proceedings of the First International Workshop on Advanced Architectures and Algorithms for Internet Delivery and Applications, Jun. 15, 2005, pp. 1-8.

Final Office Action for U.S. Appl. No. 10/446,574 dated Nov. 16, 2009.

PCT/US2004/016544 Written Opinion dated Nov. 29, 2005.

PCT/US2004/016569 IPRP dated Dec. 15, 2005.

Office Action for U.S. Appl. No. 11/486,490 dated Feb. 1, 2012, pp. 1-52.

Final Rejection for related U.S. Appl. No. 11/486,490 dated Sep. 21, 2012, pp. 1-82.

* cited by examiner

PEER-TO-PEER ENGINE FOR OBJECT SHARING IN COMMUNICATION DEVICES

TECHNICAL FIELD

This invention generally relates to network information sharing and more specifically to sharing of application specific objects between communication devices (e.g., mobile phones) using middleware containing a peer-to-peer engine.

BACKGROUND ART

Currently there is no transparent way for applications in mobile phones to upload and download files which phone users consider important to share. Either sharing files is not possible at all or the sharing is very user consuming, because the phone user has to personally oversee the transfer. The user has to make sure the files are moved to the appropriate directory and subsequently a particular application uses or edits a configuration of the application to enable usage of these new files, i.e., FTP (File Transfer Protocol) or similar means have to be used. To enable easy transfer of files with as little actions from the user as possible, there should be some kind of file sharing engine. For a better user experience the user should see the transferred file as an object for the particular application, e.g., the user can be informed that there is a new circuit, "Suzuka" for a game "Formula 1 2003" available, and not just told that a track_suzuka_ver11.tra file was downloaded in a "download" directory.

Prior art solutions are file transfer solutions where the user has to know what the files are, what they contain, what directory they should be in and how to configure the applications to use them. These previous solutions are implementations of different file transfer protocols. In all these applications little or no middleware application logic is used.

DISCLOSURE OF THE INVENTION

The object of the present invention is to provide a methodology for sharing of application specific objects between communication devices (e.g., mobile communication devices or mobile phones) using middleware containing a peer-to-peer engine.

According to a first aspect of the invention, a method for providing object sharing between a communication device and a further communication device, comprising the steps of: sending an invite by a peer-to-peer engine of the communication device to a further peer-to-peer engine of the further communication device, wherein the invite signal contains information about at least one file or a part of the at least one file available for sharing and belonging to an application X in the communication device and the information is taken from a peer-to-peer database of the communication device by the peer-to-peer engine; and transferring the at least one file or the part of the at least one file to a further peer-to-peer database of the further communication device, if the further communication device supports the application X and initiates the transfer, thus providing the object sharing.

According further to the first aspect of the invention, the at least one file or the part of the at least one file must be stored in the peer-to-peer database in order to be the object for sharing and the at least one file or the part of the at least one file may be copied from the peer-to-peer database during the transferring.

Further according to the first aspect of the invention, the transferring from the communication device to the further communication device may be facilitated by the peer-to-peer engine and by the further peer-to-peer engine, respectively.

Still further according to the first aspect of the invention, after the step of sending the invite signal, the method may further comprise the steps of: determining whether the further communication device supports the application X and optionally contains at least one further file or a part of the at least one further file belonging to the application X for sharing; and sending, if the further communication device supports the application X, an ok signal by the further peer-to-peer engine of the further communication device to the peer-to-peer engine of the communication device, wherein the ok signal contains, if available for sharing, further information about the at least one further file or the part of the at least one further file and the further information is taken from the further peer-to-peer database by the further peer-to-peer engine. Still further, the method may further comprise the step of: completing the at least one further file or the part of the at least one further file in the peer-to-peer database of the communication device and optionally storing the at least one further file or the part of the at least one further file in the peer-to-peer database in order to be the object for sharing. Yet still further, the at least one further file or the part of the at least one further file after the completing may be moved or copied to a corresponding application directory X out of N application directories available in the communication device and, if the at least one further file or the part of the at least one further file is moved out of the peer-to-peer database, it may no longer be available for sharing in the communication device, wherein N is an integer of at least a value of one. Yet further still, the completing may include storing in the peer-to-peer database data regarding the at least one further file or the part of the at least one further file containing a file name, a file type, file metadata, an application ID, a checksum, a file size, pointers to various file parts, pointers to various checksums of the corresponding file parts, an indication of a file availability for sharing and an indication of a file completeness.

According still further to the first aspect of the invention, all signals originated from and received by the peer-to-peer engine and the further peer-to-peer engine may be transported by second generation (2G) general packet radio system (GPRS) means, by third generation (3G) general packet radio system (GPRS) means, by code division multiple access (CDMA) means, by wideband code division multiple access (WCDMA) means, by Bluetooth means, by wireless local area networks (WLAN) means, or by upper memory block (UMB) means.

According further still to the first aspect of the invention, all the steps initiated by corresponding users of the communication device or the further communication device may be performed automatically by the peer-to-peer engine and the further peer-to-peer engine, respectively.

Yet still further according to the first aspect of the invention, the further information may include a file name, a checksum, a file type and a bit field describing what file parts are available to share regarding the at least one further file or the part of the at least one further file.

According yet further still to the first aspect of the invention, the method may further comprise the step of: completing the at least one file or the part of the at least one file in the further peer-to-peer database of the further communication device and optionally storing the at least one file or the part of the at least one file in the further peer-to-peer database in order to be the object for sharing. Still further, the at least one file or the part of the at least one file after the completing may be moved or copied to a corresponding application directory X available in the further communication device and, if the at least one file or the part of the at least one file is moved out of the further peer-to-peer database, it may no longer be available for sharing in the further communication device. Yet still further, the completing may include storing in the further peer-to-peer database data regarding the at least one file or the part of the at least one file containing a file name, a file type, file meta-data, an application ID, a checksum, a file size, pointers to various file parts, pointers to various checksums of the corresponding file parts, an indication of a file availability for sharing and an indication of a file completeness.

Still yet further according to the first aspect of the invention, the communication device may be a mobile communication device or a mobile phone.

According further to the first aspect of the invention, the information may include a file name, a checksum, a file type and a bit field describing what file parts are available to share regarding the at least one file or the part of the at least one file.

According to a second aspect of the invention, a communication device for providing object sharing between the communication device and a further communication device, comprising: a peer-to-peer engine, for sending an invite signal to a further peer-to-peer engine of the further communication device, wherein the invite signal contains information about at least one file or a part of the at least one file available for sharing and belonging to an application X in the communication device, for providing the at least one file or the part of the at least one file for transferring to a further peer-to-peer database of the further communication device, if the further communication device supports the application X and initiates the transfer, thus providing the object sharing; and a peer-to-peer database, for storing the information about the at least one file or the part of the at least one file, wherein the information is taken from a peer-to-peer database of the communication device by the peer-to-peer engine.

According further to the second aspect of the invention, the at least one file or the part of the at least one file must be stored in the peer-to-peer database in order to be the object for sharing and the at least one file or the part of the at least one file may be copied from the peer-to-peer database during the transferring.

Further according to the second aspect of the invention, the transferring from the communication device to the further communication device may be facilitated by the peer-to-peer engine and by the further peer-to-peer engine, respectively.

Still further according to the second aspect of the invention, after sending the invite signal, it may be determined whether the further communication device supports the application X and optionally contains at least one further file or the part of the at least one further file belonging to the application X for sharing, and, if it is determined that the further communication device supports the application X, an ok signal may be sent by the further peer-to-peer engine of the further communication device to the peer-to-peer engine of the communication device, wherein the ok signal contains, if available for sharing, further information about the at least one further file or the part of the at least one further file and the further information is taken from the further peer-to-peer database by the further peer-to-peer engine. Still further, after sending an ok signal, an acknowledgement signal may be sent by the peer-to-peer engine of the communication device to the further peer-to-peer engine of the further communication device, and the at least one further file or the part of the at least one further file may be transferred from the peer-to-peer further database to the peer-to-peer database, if the communication device initiates the transfer, thus providing further the object sharing. Further still, the at least one further file or the part of the at least one further file in the peer-to-peer database of the communication device may be completed and optionally stored in the peer-to-peer database in order to be the object for sharing. Yet further, the at least one further file or the part of the at least one further file after the completing may be moved or copied to a corresponding application directory X out of N application directories available in the communication device and, if the at least one further file or the part of the at least one further file is moved out of the peer-to-peer database, it may no longer be available for sharing in the communication device, wherein N is an integer of at least a value of one. Yet still further, the completing may include storing in the peer-to-peer database data regarding the at least one further file or the part of the at least one further file containing a file name, a file type, file meta-data, an application ID, a checksum, a file size, pointers to various file parts, pointers to various checksums of the corresponding file parts, an indication of a file availability for sharing and an indication of a file completeness.

According further to the second aspect of the invention, the all signals originated from and received by the peer-to-peer engine and the further peer-to-peer engine may be transported by second generation (2G) general packet radio system (GPRS) means, by third generation (3G) general packet radio system (GPRS) means, by code division multiple access (CDMA) means, by wideband code division multiple access (WCDMA) means, by Bluetooth means, by wireless local area networks (WLAN) means, or by upper memory block (UMB) means.

According still further to the second aspect of the invention, the further information may include a file name, a checksum, a file type and a bit field describing what file parts are available to share regarding the at least one further file or the part of the at least one further file.

According further still to the second aspect of the invention, the communication device may further comprise: a peer-to-peer management block, for managing the peer-to-peer engine and the peer-to-peer database.

According yet further still to the second aspect of the invention, the information may include a file name, a checksum, a file type and a bit field describing what file parts are available to share regarding the at least one file or the part of the at least one file.

Yet still further according to the second aspect of the invention, the communication device may be a mobile communication device or a mobile phone.

According to a third aspect of the invention, a computer program product comprising: a computer readable storage structure embodying computer program code thereon for execution by a computer processor with the computer program code characterized in that it includes instructions for performing the steps of the first aspect of the invention indicated as being performed by any component or a combination of components of the communication device or the further communication device.

According to a fourth aspect of the invention, middleware of a communication device for providing object sharing between the communication device and a further communication device, comprising: a peer-to-peer engine, for sending an invite signal to a further peer-to-peer engine of the further communication device, wherein the invite signal (contains information about at least one file or a part of the at least one file available for sharing and belonging to an application X in the communication device, for providing the at least one file or the part of the at least one file for transferring to a further peer-to-peer database of the further communication device, if the further communication device supports the application X and initiates the transfer, thus providing the object sharing;

and a peer-to-peer database, for storing the information about the at least one file or the part of the at least one file, wherein the information is taken from a peer-to-peer database of the communication device by the peer-to-peer engine.

According further to the fourth aspect of the invention, the at least one file or the part of the at least one file must be stored in the peer-to-peer database in order to be the object for sharing and the at least one file or the part of the at least one file may be copied from the peer-to-peer database during the transferring.

BRIEF DESCRIPTION OF THE DRAWINGS

For a better understanding of the nature and objects of the present invention, reference is made to the following detailed description taken in conjunction with the following drawings, in which.

BEST MODE FOR CARRYING OUT THE INVENTION

The present invention provides a new methodology for sharing of application specific objects between communication devices (e.g., mobile communication devices or mobile phones) using middleware containing a peer-to-peer engine. This engine is completely peer-to-peer based and no servers are needed in the network. Although from a user perspective the transferred items in these peer-to-peer sessions are objects of a certain application, they are files for the peer-to-peer engine middleware, so the term "file" can be also used instead of the term "object". Especially games are seen as a promising potential application of the present invention.

An application registers to the peer-to-peer (P2P) engine when it wants to share or download files. The P2P engine takes care of the file sharing and informs when a new file has been downloaded so the application can start using it. The P2P engine does not understand the contents of the file; it just delivers them to the appropriate application directories. The P2P engine can use a cellular connection, e.g., a second generation (2G) general packet radio system (GPRS), a third generation (3G) GPRS, a code division multiple access (CDMA), a wideband code division multiple access (WCDMA), etc., or a proximity radio connection, e.g., a Bluetooth, a wireless local area networks (WLAN), an upper memory block (UMB), etc. as a transport for the file sharing. The choice of the transport is left to the user.

Figure 1:
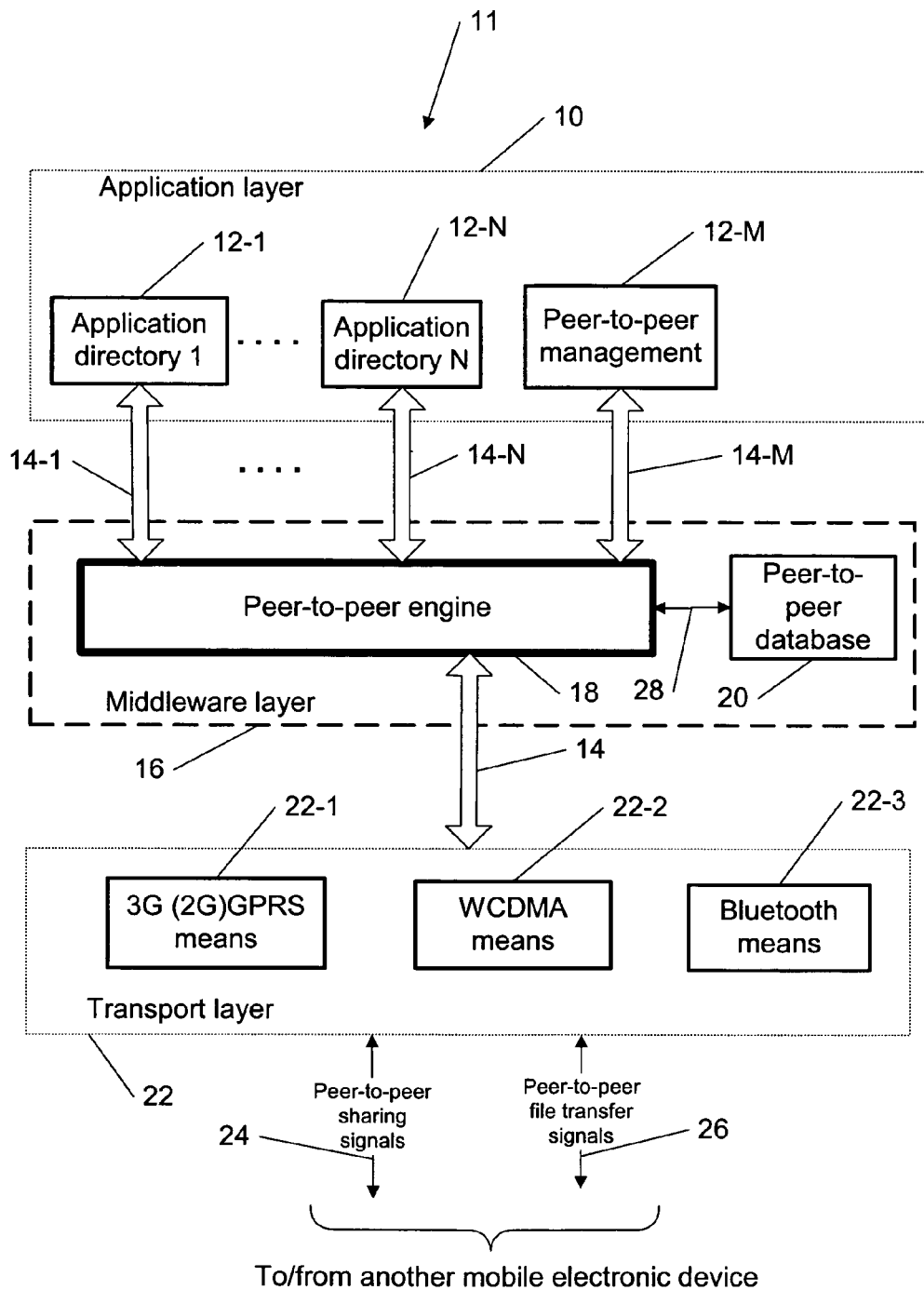
FIG. 1 shows an example of a block diagram for a communication device (e.g., a mobile phone) with middleware for peer-to-peer object sharing, according to the present invention.

FIG. 1 shows one example among others of a block diagram for a communication device (e.g., a mobile phone) 11 with middleware for peer-to-peer object sharing, according to the present invention.

As shown in FIG. 1 a middleware layer 16 sits between an application layer 10 and a transport layer 22. Each of N application directories 12-1, 12-2, ..., 12-N (N is an integer of at least a value of one) of the application layer 10 contains one of N different applications and files associated with them.

Any of these N application directories can register with a peer-to-peer engine 18 of the middleware layer 16 when it wants to share or download files through a corresponding application programming interface (API) out of N APIs 14-1, 14-2, ..., 14-N. The peer-to-peer engine (P2P) 18 takes care of the file sharing as described in more detail below and informs the appropriate application directory out of said of N application directories 12-1, 12-2, ..., 12-N when a new file has been downloaded so the appropriate application directory can start using it. The P2P engine 18 does not understand the contents of the file but delivers them to the appropriate application directories. All signals related to file sharing (e.g., peer-to-peer sharing signals 24 and/or peer-to-peer file transfer signals 26) originated from and received by said peer-to-peer engine 18 through an interface 14 are transported, e.g., by second generation (2G) or third generation (3G) general packet radio system (GPRS) means 22-1, by wideband code division multiple access (WCDMA) means 22-2, or by Bluetooth means 22-3, all of the transport layer 22. The choice of the transport means is left to the user. FIG. 1 only shows a few examples of the transport means. As it is pointed out above, in general, the transport means can be a broad class of connection including the cellular connection (e.g., the 2G GPRS, 3G GPRS, CDMA, WCDMA, etc.) or the proximity radio connection (e.g., the Bluetooth, WLAN, UMB, etc.).

Regarding the example of FIG. 1, the difference between the GPRS/WCDMA transport and the Bluetooth transport regarding the present invention is that in the GPRS/WCDMA transport the user cannot share files with all the users connected to GPRS/WCDMA networks that have the same P2P engine. Instead, the user has to find other users and tell them that he/she wants to share files with them. On the contrary, in the Bluetooth transport, a user communication base (a number of other users) is limited because of a small range, so the user can keep searching and scanning through the other users inside the Bluetooth coverage and share the files with them on a continuous basis. Another factor which makes Bluetooth transport easier is because the data transfer in Bluetooth transport is free, whereas it is not free in the GPRS/WCDMA transport.

The middleware layer 16 also contains another important component defining the present invention: the peer-to-peer (P2P) database 20. The P2P database 20 contains the file or a part of said file that is shared and/or under download. The user can decide if the downloaded file or the part of the file can be further shared after the download is completed. If that is the case, the file or the part of the file is completed as described below and saved in the P2P database 20. If, however, the user decides not to share the file or the part of the file further after the download is complete, then the file or the part of the file is moved to an appropriate application directory out of said N application directories 12-1, 12-2, ..., 12-N. This will prevent sharing of these files, and information about the file is removed from the P2P database 20. If, however, the file is only copied from the P2P database 20 to the appropriate application directory out of said N application directories 12-1, 12-2, ..., 12-N, the file can continue being shared.

Thus only the files being downloaded are always physically in the P2P database 20. Only files to be shared and completed files are stored in the in the P2P database 20. Most of the downloaded files are in the N application directories 12-1, 12-2, ..., 12-N and the P2P database 20 only contains links to those files through the P2P engine 18. This ensures that a memory (or a disk space) is used as little as possible.

A peer-to-peer management block 12-M is for managing the peer-to-peer engine 18 and the peer-to-peer database 20 through the application programming interface (API) 14-M.

For example, the user can access the shared files in addition to the application described above, delete temporarily files in the peer-to-peer database 20 (through the peer-to-peer engine 18), change temporarily folders for the peer-to-peer database 20, etc.

Figure 2A:
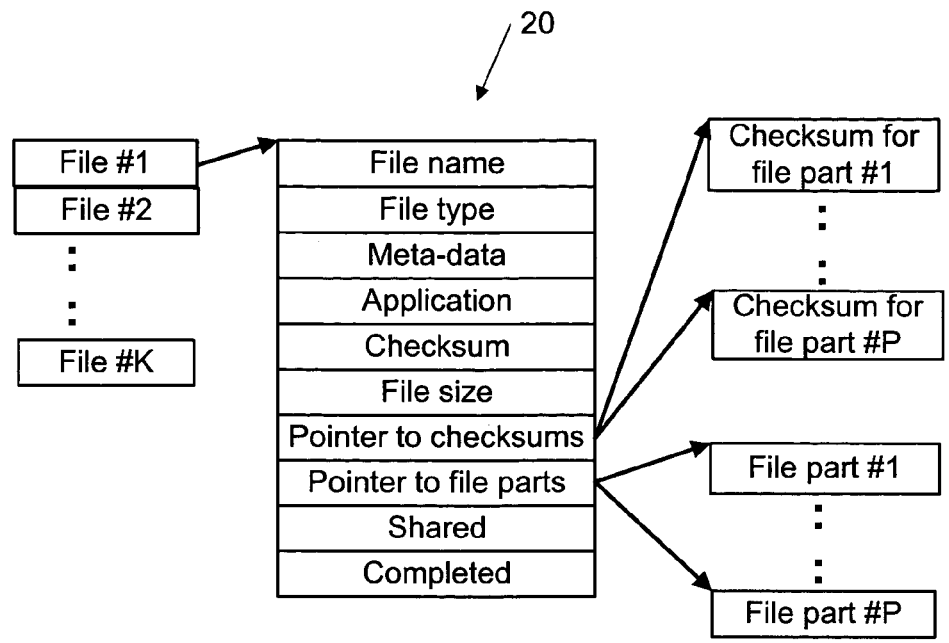
FIG. 2a shows an example of a structure of a peer-to-peer database, according to the present invention.

FIG. 2a shows one example among others of a structure of the P2P database 20 containing K files, according to the present invention.

The content of any file entry in the P2P database 20 can be as follows:

A file name

A file type. This is a string the application assigns to the file so it can recognize the object and knows what to do with it. For example, application "Formula one game" could use the file type "circuit" and the file name "Suzuka".

An application ID. This ID is used by the P2P engine 18 to keep track which application directory out of the N application directories 12-1, 12-2, . . . , 12-N is the owner of this file. The application ID is given at the time the application registered to the P2P engine 18. When the file is completed this application is prompted. Assigning the application ID is based on IANA (Internet Assigned Number Authority) guidelines for naming the application, for example vnd.nokia.chess (vnd means vendor specific). These Application IDs must be globally unique for an application.

Application meta-data. This is a user understandable description (text, figures, etc.) of the content of the file, e.g., "Suzuka track for F1 game with astonishing graphics". Meta-data can be used by the user to select only desirable files.

Checksum. This is used for checking integrity of the received file. If the checksum does not match the checksum calculated from completed file, the file is corrupted.

File size.

Pointer to part checksums. A single file is composed of one or several parts (e.g., P parts, each with a size, e.g., 100 kB). Each of these parts has its own checksum. This ensures that if a part of a file has become corrupted the whole file does not need to be downloaded again, just the corrupted 100 kB part. The size of the last part can be less than 100 kB.

Pointer to the file parts. When a new file is downloaded a space of the size of the file is allocated in the P2P database 20. This space is divided into, e.g., 100 kB parts, to be downloaded separately. When all the parts have been downloaded, the space is continuous and the file is complete.

Share. This is a bit field indicating if the file should be shared to other users.

Completed. This is a bit field indicating if the file is complete.

The file downloaded into the P2P database 20 is complete when all the above information is available in the P2P database 20 for that file.

Generally, a peer-to-peer sharing protocol, according to the present invention, contains two parts: signaling (represented by the peer-to-peer sharing signal 24 in FIG. 1) and a file transfer (represented by the peer-to-peer file transfer signal 26 in FIG. 1). In the signaling protocol two participants are describing what files they have to share and what are they looking for. The file transfer protocol is used to transfer the files one part at a time. The transfer is one way only, so if both users want to download something from each other there are two file transfer sessions.

Figure 2B:
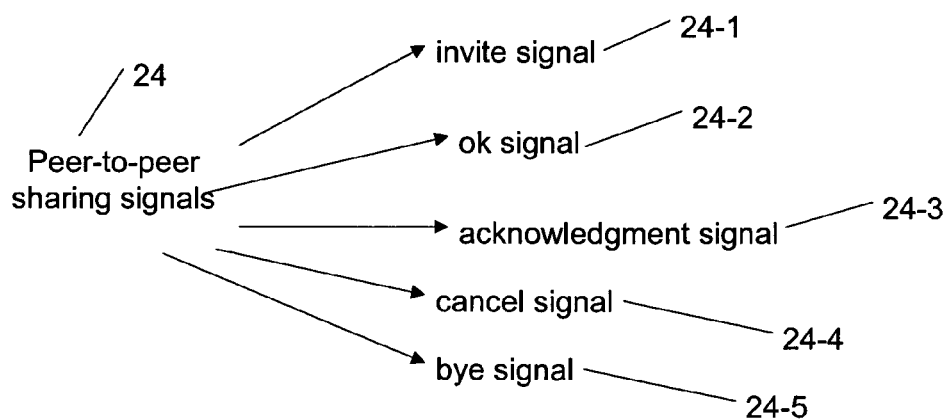
FIG. 2b shows examples of peer-to-peer sharing signals used for signaling in a peer-to-peer sharing protocol, according to the present invention.

FIG. 2b shows one example among many others of peer-to-peer sharing signals 24 used for signaling in peer-to-peer sharing protocol, according to the present invention. The peer-to-peer sharing signals 24 can include an invite signal 24-1, an ok signal 24-2, an acknowledgement signal 24-3, a cancel signal 24-4 and a bye signal 24-5.

In the signaling protocol both parties offer the files they have to share. Based on this information and what files they already have, they start file transfer sessions to acquire desired files. These sessions can be one by one or simultaneous, based on implementation and terminal capabilities of the phones. In the beginning of the signaling protocol session there are three messages exchanged, "invite", "ok" and "acknowledgement" corresponding to the invite signal 24-1, the ok signal 24-2 and the acknowledgement signal 24-3, respectively. The "invite" describes the files to share belonging to an application X (one out of the N application directories 12-1, 12-2, . . . , 12-N) in an A party (e.g., the communication device 11 of FIG. 1).

The description of the file, according to the present invention, can consist of, e.g., the file name, the file checksum, the file type and a bit field describing what are the parts the sharer has. E.g., 101100 would mean the sharer has parts 1, 3 and 4 of the file consisting of six parts.

If a B party (e.g., a further communication device with similar features as the communication device 11 of FIG. 1) has the application X and some files to share whose owner is the application X, the B party sends the "ok" message back, with a description what files it has. When the A party receives the "ok" message it sends the "acknowledgement" message back and the A party starts a file transfer session to get some file it wants from the B party and similarly the B party starts its own file transfer session to get some file it wants from the A party (there are two separate transfer sessions as mentioned above). If the A or B party does not want any new files to be transferred, it does not start its file transfer session. In case the B party does not have application X, it sends the "cancel" message (corresponding to the cancel signal 24-4) back and the signaling session for the application X files ends. In case neither party wants to transfer any file after the successful signaling session starts, the A or B party can send a "bye" message (corresponding to the bye signal 24-5) after a timeout if no file transfer session is started. The "bye" message is followed by another "bye" message from the other end.

There are many possible variations to the procedures described above. For example, there can be a need for security features, which would ensure that the shared files are really generated by the correct application (one of the N application directories 12-1, 12-2, . . . , 12-N). There could be a need to sign the shared file by the corresponding application.

Also there can be several alternatives how files are shared automatically between the users. For example, a totally automatic solution will share automatically all files that are marked as shared in a database. In other words, in this solution all the files belonging to a certain application which the other side (user) does not have (assuming that the other side supports said application), these files are transferred "automatically" to the other side. In a semiautomatic solution the middleware will ask another user if he/she wants to download these specific objects (files) of a certain application to his/her terminal (phone). The middleware will show, e.g., application meta-data and size of a file, etc. (as described above) to help the other side to make the decision. Yet in an alternative implementation, it can be also possible to invoke file sharing from the application menu. In an application menu there could be an option to start the object sharing with a specific user and the application would then ask the middleware to take care of the actual file sharing.

Furthermore, the signaling protocol could be an SIP (Session Initiation Protocol), the file sharing information could be in the payload of an "invite" message (as described above). This payload can use an SDP (Session Description Protocol), which describes session capabilities of the sender. In the 200 ok response there is the SDP of the other end. These mechanics could easily be reused by this invention.

Figure 3:
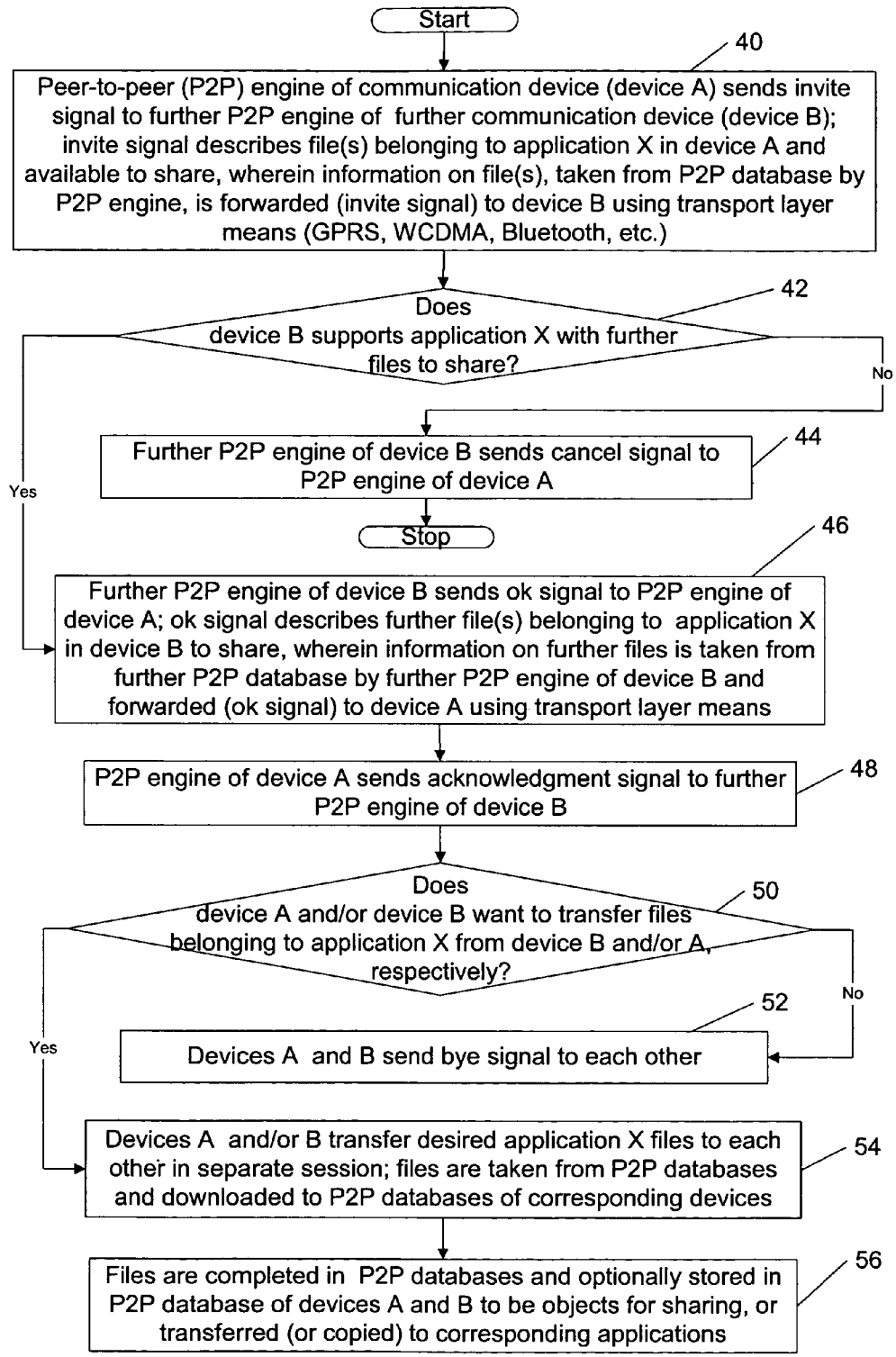
FIG. 3 shows an example of a flow chart for a peer-to-peer object sharing protocol between communication devices (e.g., mobile phones), according to the present invention.

FIG. 3 shows an example of a flow chart for a peer-to-peer object sharing protocol between communication devices (e.g., mobile phones), according to the present invention.

The flow chart of FIG. 3 represents only one possible scenario among many others. In a method according to the present invention, in a first step 40, the peer-to-peer (P2P) engine of the communication device 11 (device A) sends the invite signal 24-1 to a further P2P engine of a further communication device (device B). The invite signal describes the files (at least the one file) belonging to an application X (one of the N application directories 12-1, 12-2, . . . , 12-N) in the device A and available to share, wherein information on the files, taken from the P2P database 20 by P2P engine 18, is forwarded (the invite signal 24-1) to the device B using transport layer means (e.g., the GPRS, WCDMA or Bluetooth means 22-1, 22-1, or 22-3). In a next step 42, it is determined whether the device B supports said application X with further files (at least the one further file) belonging to said application X for sharing. If that is not the case (the device B does not support said application X), in a step 44, the further P2P engine of the device B sends the cancel signal 24-4 to the P2P engine 18 of the device A and the process stops. If, however, it is determined that the device B supports said application X, in a next step 46, the P2P engine of the device B sends the ok signal 24-2 to the P2P engine of the device A; the ok signal 24-2 describes the further files (at least the one further file) belonging to the application X in the device B to share, wherein information on the further files is taken from the further P2P database by the further P2P engine of the device B and forwarded (the ok signal 24-2) to the device A using transport layer means described above.

In a next step 48, the P2P engine 18 of the device A sends the acknowledgment signal 24-3 to the further P2P engine of the device B. In a next step 50, it is determined whether the device A and/or the device B want to transfer files belonging to the application X from the device B and/or A, respectively. If that is not the case in a step 52, the devices A and B send a bye signal 24-5 to each other. If, however, it is determined that the device A and/or the device B want to transfer files belonging to the application X from the device B and/or A, in a next step 54, the devices A and/or B transfer desired application X files to each other in the separate session (see the signal 26 in FIG. 1); the files and further files are taken from the P2P database 20 and from the further data base, respectively, and downloaded to the further P2P database and to the P2P database 18 of the corresponding devices A and B.

In a final step 56, the transferred files are completed in the P2P database and in the further P2P database of the devices A and B and optionally stored in these P2P databases or copied to the corresponding applications (application directories 12-1, 12-2, . . . , 12-N) to be the objects for sharing. Alternatively, these transferred files can be moved to the corresponding applications (application directories 12-1, 12-2, . . . , 12-N) and then they are not available for sharing.

What is claimed is:

1. A method, comprising:
    causing, at least in part, transmission of a peer-to-peer sharing signal from a communication device to another communication device over a peer-to-peer connection, wherein the peer-to-peer signal contains information specifying an application of at least one application-specific file stored in the communication device or a portion of the application-specific file available for sharing;
    determining if the other communication device supports the application; and
    transferring over the peer-to-peer connection the at least one application-specific file or the portion to the other communication device, if the other communication device supports the application.

2. A method of claim 1, wherein the at least one application-specific file or the portion is stored in a peer-to-peer database for sharing, and the at least one application-specific file or the portion is copied from the peer-to-peer database for the application to the other communication device.

3. A method of claim 1, wherein the transferring is facilitated by a peer-to-peer engine of the communication device and by a peer-to-peer engine of the other communication device.

4. A method of claim 1, wherein after the peer-to-peer signal is sent from the communication device to the other communication device, the method further comprising:
    determining if at least one other application-specific file stored in the other communication device or a portion of the application-specific file belongs to the application supported in the other communication device is available for sharing; and
    receiving, if the other communication device supports the application, a response signal from the other communication device at the communication device, wherein the response signal comprises additional information specifying the application of the at least one other application-specific file or the portion.

5. A method of claim 4, wherein after the receiving the response signal, the method further comprising:
    causing, at least in part, transmission of an acknowledgement signal by the communication device to the other communication device, and
    receiving the at least one other application-specific file or the portion at the communication device.

6. A method of claim 4, wherein the additional information includes a file name, a checksum, a file type specific to an application, a bit field describing what file portions available to share, file meta-data, an application identification of the application, a file size, pointers to file portions, pointers to checksums of the corresponding file portions, an indication of a file availability for sharing, an indication of a file completeness, or a combination thereof, of the stored at least one other application-specific file or the portion.

7. A method of claim 5, further comprising:
    storing the received at least one other application-specific file or the portion in a peer-to-peer database of the communication device for sharing.

8. A method of claim 5, wherein all signals originated from and received by the communication device and the other communication device are transmitted by second generation general packet radio system means, by third generation general packet radio system means, by code division multiple access means, by wideband code division multiple access means, by Bluetooth means, by wireless local area networks means, or by upper memory block means, or a combination thereof.

9. A method of claim 5, wherein file sharing initiated by the communication device or the other communication device is performed without user intervention, respectively.

10. A method of claim 7, wherein the stored at least one other application-specific file or the portion is moved or copied to a corresponding application directory out of N application directories available in the communication device and, if the stored at least one other application-specific file or the portion is moved out of the peer-to-peer database and becomes unavailable for sharing, wherein N is a positive integer.

11. A method of claim 7, wherein the peer-to-peer database further stores data regarding the at least one other application-specific file or the portion including a file name, a file type specific to an application, file meta-data, an application identification of the application, a checksum, a file size, pointers to file portions, pointers to checksums of the corresponding file portions, an indication of a file availability for sharing, an indication of a file completeness, or a combination thereof.

12. A method of claim 1, further comprising:
storing the received at least one application-specific file or the portion in a peer-to-peer database of the communication device for sharing.

13. A method of claim 12, wherein the stored at least one application-specific file or the portion is moved or copied to a corresponding application directory in the other communication device and, if the stored at least one application-specific file or the portion is moved out of the other peer-to-peer database and becomes unavailable for sharing.

14. A method of claim 12, wherein the peer-to-peer database further stores data regarding the at least one other application-specific file or the portion including a file name, a file type specific to an application, file meta-data, an application identification of the application, a checksum, a file size, pointers to file portions, pointers to checksums of the corresponding file portions, an indication of a file availability for sharing, an indication of a file completeness, or a combination thereof.

15. A method of claim 1, wherein the communication device is a mobile communication device or a mobile phone.

16. A method of claim 1, wherein the information includes a file name, a checksum, a file type specific to an application, a bit field describing what file portions available to share, file meta-data, an application identification of the application, a file size, pointers to file portions, pointers to checksums of the corresponding file portions, an indication of a file availability for sharing, an indication of a file completeness, or a combination thereof, of the stored at least one application-specific file or the portion.

17. A method of claim 1, further comprising:
determining to register a plurality of applications with the communication device to share files specific to each of the applications available at one or more other communication devices.

18. A method of claim 17, further comprising:
causing, at least in part, transmission of a new file that has been downloaded and is specific to a registered application to a directory corresponding to the registered application; and
informing the registered application the new file and the corresponding directory.

19. A method of claim 1, wherein the application is a gaming application.

20. A communication device, comprising:
a peer-to-peer engine of the communication device, configured to send a peer-to-peer sharing signal to another peer-to-peer engine of another communication device over a peer-to-peer connection, wherein said peer-to-peer sharing signal contains information specifying an application of at least one application-specific file stored in the communication device or a portion of the application-specific file available for sharing, wherein the peer-to-peer engine is further configured to determine if the other communication device supports the application, and transfer over the peer-to-peer connection the at least one application-specific file or the portion to the other communication device, if the other communication device supports the application; and
a peer-to-peer database, configured to store the information.

21. A communication device of claim 20, further comprising:
a peer-to-peer management block configured to manage the peer-to-peer engine and the peer-to-peer database.

22. A non-transitory computer-readable storage medium carrying one or more sequences of one or more instructions which, when executed by one or more processors, cause an apparatus to at least perform the following steps:
causing, at least in part, transmission of a peer-to-peer sharing signal from a communication device to another communication device over a peer-to-peer connection, wherein the peer-to-peer signal contains information specifying an application of at least one application-specific file stored in the communication device or a portion of the application-specific file available for sharing;
determining if the other communication device supports the application; and
transferring over the peer-to-peer connection the at least one application-specific file or the portion to the other communication device, if the other communication device supports the application.

23. A non-transitory computer-readable storage medium of claim 22, wherein the one or more sequences of one or more instructions constitute middleware.

24. An apparatus, comprising:
at least one processor; and
at least one memory including computer program code for one or more programs,
the at least one memory and the computer program code configured to, with the at least one processor, cause the apparatus to perform at least the following,
cause, at least in part, transmission of a peer-to-peer sharing signal from a communication device to another communication device over a peer-to-peer connection, wherein the peer-to-peer signal contains information specifying an application of at least one application-specific file stored in the communication device or a portion of the application-specific file available for sharing;
determine if the other communication device supports the application; and
transfer over the peer-to-peer connection the at least one application-specific file or the portion to the other communication device, if the other communication device supports the application.

25. An apparatus of claim 24, wherein the at least one application-specific file or the portion is stored in a peer-to-peer database for sharing, and the at least one application-specific file or the portion is copied from the peer-to-peer database for the application to the other communication device.

26. An apparatus of claim 24, wherein the transferring is facilitated by a peer-to-peer engine of the communication device and by a peer-to-peer engine of the other communication device.

27. An apparatus of claim 24, wherein after the peer-to-peer signal is sent from the communication device to the other communication device, and the apparatus is further caused to:

determining if at least one other application-specific file stored in the other communication device or a portion of the application-specific file belongs to the application supported in the other communication device is available for sharing; and receive, if the other communication device supports the application, a response signal from the other communication device at the communication device, wherein the response signal comprises additional information specifying the application of the at least one other application-specific file or the portion.

28. An apparatus of claim 27, wherein after receiving the response signal, the apparatus is further caused to:

cause, at least in part, transmission of an acknowledgement signal by the communication device to the other communication device, and receive the at least one other application-specific file or the portion at the communication device.

29. An apparatus of claim 28, wherein the apparatus is further caused to:

store the received at least one other application-specific file or the portion in a peer-to-peer database of the communication device for sharing.

30. An apparatus of claim 28, wherein all signals originated from and received by the communication device and the other communication device are transmitted by second generation general packet radio system means, by third generation general packet radio system means, by code division multiple access means, by wideband code division multiple access means, by Bluetooth means, by wireless local area networks means, or by upper memory block means, or a combination thereof.

31. An apparatus of claim 28, wherein file sharing initiated by the communication device or the other communication device is performed without user intervention, respectively.

32. An apparatus of claim 29, wherein the stored at least one other application-specific file or the portion is moved or copied to a corresponding application directory out of N application directories available in the communication device and, if the stored at least one other application-specific file or the portion is moved out of the peer-to-peer database and becomes unavailable for sharing, wherein N is a positive integer.

33. An apparatus of claim 29, wherein the peer-to-peer database further stores data regarding the at least one other application-specific file or the portion including a file name, a file type specific to an application, file meta-data, an application identification of the application, a checksum, a file size, pointers to file portions, pointers to checksums of the corresponding file portions, an indication of a file availability for sharing, an indication of a file completeness, or a combination thereof.

* * * * *